United States Patent
Hamming et al.

(10) Patent No.: US 7,274,528 B2
(45) Date of Patent: Sep. 25, 2007

(54) SYSTEM AND METHOD FOR PROTECTING HEAD ELEMENTS OF A TAPE DRIVE

(75) Inventors: John Anthony Hamming, San Clemente, CA (US); Robert Ralph Heinze, San Clemente, CA (US); Umang Mehta, Irvine, CA (US)

(73) Assignee: Certance LLC, Costa Mesa, CA (US)

( * ) Notice: Subject to any disclaimer, the term of this patent is extended or adjusted under 35 U.S.C. 154(b) by 0 days.

(21) Appl. No.: 11/083,651

(22) Filed: Mar. 17, 2005

(65) Prior Publication Data
US 2006/0209447 A1 Sep. 21, 2006

(51) Int. Cl.
*G11B 21/12* (2006.01)
*G11B 15/67* (2006.01)

(52) U.S. Cl. .......................... 360/75; 360/71
(58) Field of Classification Search ..................... None
See application file for complete search history.

(56) References Cited

U.S. PATENT DOCUMENTS

| | | | | |
|---|---|---|---|---|
| 3,764,088 A * | 10/1973 | Yamada et al. | ........... | 242/332.2 |
| 5,293,285 A * | 3/1994 | Leonhardt et al. | ............ | 360/95 |
| 5,815,337 A | 9/1998 | Milo | | |
| 5,923,494 A * | 7/1999 | Arisaka et al. | ................ | 360/75 |
| 5,978,172 A | 11/1999 | Nayak et al. | | |
| 6,034,839 A | 3/2000 | Hamming | | |
| 6,050,514 A * | 4/2000 | Mansbridge | ............. | 242/332.7 |
| 6,082,652 A | 7/2000 | Theobald | | |
| 6,115,218 A | 9/2000 | Milo et al. | | |
| 6,157,516 A * | 12/2000 | Hertrich et al. | ............. | 360/128 |
| 6,257,514 B1 * | 7/2001 | Morris et al. | ............ | 242/332.1 |
| 6,590,743 B2 | 7/2003 | Nawa | .......................... | 360/128 |
| 6,655,623 B2 | 12/2003 | Kaneda et al. | | |
| 6,714,381 B2 * | 3/2004 | Willems, Jr. | ........... | 360/130.21 |
| 6,819,528 B1 | 11/2004 | Cates et al. | | |
| 7,061,711 B2 * | 6/2006 | Reiners | ................... | 360/77.12 |
| 2002/0041470 A1 | 4/2002 | Nayak et al. | | |
| 2002/0044372 A1 | 4/2002 | Hamming et al. | | |
| 2004/0001284 A1 | 1/2004 | Nayak et al. | | |
| 2004/0129816 A1 | 7/2004 | Hamming | | |
| 2006/0175452 A1 * | 8/2006 | Biskeborn | ................... | 242/346 |

OTHER PUBLICATIONS

"Self Threading Leader Tape," Oct. 1982, IBM TDB vol. 25, No. 5, pp. 2486-2487.*
StorNet Solutions, "Tape Drive Technologies Primer" StorNet Solutions 1-877-STORNET, www.storenetsolutions.com pp. 1-68, no date.

* cited by examiner

*Primary Examiner*—Hoa Thi Nguyen
*Assistant Examiner*—James L Habermehl
(74) *Attorney, Agent, or Firm*—Mark J. Spolyar

(57) ABSTRACT

A method and apparatus is provided to protect head elements on a head of a head guide assembly, having a magnetic tape, and a leader coupled to the magnetic tape at a first end, such that the height of the leader is less than the height of the magnetic tape.

16 Claims, 5 Drawing Sheets

SYSTEM AND METHOD FOR PROTECTING HEAD ELEMENTS OF A TAPE DRIVE

FIELD OF THE INVENTION

The present invention relates to tape drives. More particularly, the present invention relates to a system and method to protect head elements of a tape drive.

BACKGROUND OF THE INVENTION

Magnetic tape data storage devices, or tape drives, have long been used for storing large quantities of computer data. More recently, as disc drives have become increasingly faster, tape drives have become more popular for long term data storage and backup. In the forward mode, tape is moved from a supply reel, which supplies the tape, to a take-up reel, which draws tape from the supply reel along a tape path and over the magnetic read/write head. In the reverse mode, tape is moved from the take-up reel to the supply reel.

FIG. 1 schematically illustrates a tape drive 100. The drive 100 accepts a cartridge 102 which has a single reel of tape, generally the supply reel, in the cartridge 102 or magazine. This type of cartridge 102 is used with a tape drive 100 having a take-up reel 104 permanently housed in the tape drive 100. When the tape cartridge 102 is installed in the driving apparatus, a magnetic tape 106 is pulled out of the tape cartridge 102, connected to a leader 110 at connector 108, and is wound by the take-up reel 104 to travel past a head and guide assembly (HGA) 112. The HGA 112 may be used to guide the tape 106 to the take-up reel 104 and back to the cartridge 102. The HGA 112, which reads from and writes to the tape 106, is located along the tape path, and the take-up reel 104 serves to draw the tape across the magnetic read/write head.

The storage and recovery of data from a tape drive is accomplished by head elements in a read/write head. The data is stored in the form of magnetic flux reversals within the magnetic coating on the tape. To maximize flux reversal sharpness, and therefore maximize the amplitude of the data pulses read and written, the head elements are vertically aligned as accurately as possible with the tape as it moves laterally past the elements.

FIG. 2 illustrates the head and guide assembly. The head and guide assembly 112 includes a head 202, and head elements 204 are mounted on the head 202. The faces of the head 202 and head elements 204 together form a substantially continuous surface to contact the leader and the tape. The leader 110 is in direct contact with the head 202 and head elements 204 both during loading (direction of arrow A) and unloading (direction of arrow B) of the tape 106. However, we have found that the leader 110 can drag particles 204a, 204b, 204n (where n is an integer) across the head elements 204 and cause scratching or gouges. These scratches or gouges can degrade the transfer of data between the head elements 204 and the tape 106.

BRIEF DESCRIPTION OF THE INVENTION

A method and apparatus is provided to protect head elements on a head of a head guide assembly, having a magnetic tape, and a leader coupled to the magnetic tape at a first end, so that the leader does not contact the head elements and the magnetic tape contacts the head elements.

A combination of mechanical components and electronic controls are used to avoid the leader coming in direct contact with the head elements during loading and unloading of the tape. This prevents the leader from dragging hard particles onto the head elements and scratching the surfaces of the head elements.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

Embodiments of the present invention are described herein in the context of a system and method for protecting head elements of a tape drive. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A system and method to protect the head elements of a tape drive is described with reference to a Linear Tape Open (LTO) cartridge made by Certance, Inc., Hewlett Packard, and IBM. However, it will be appreciated that this is for exemplary purposes only as the invention may be used with other types of tape drives.

Figure 1:
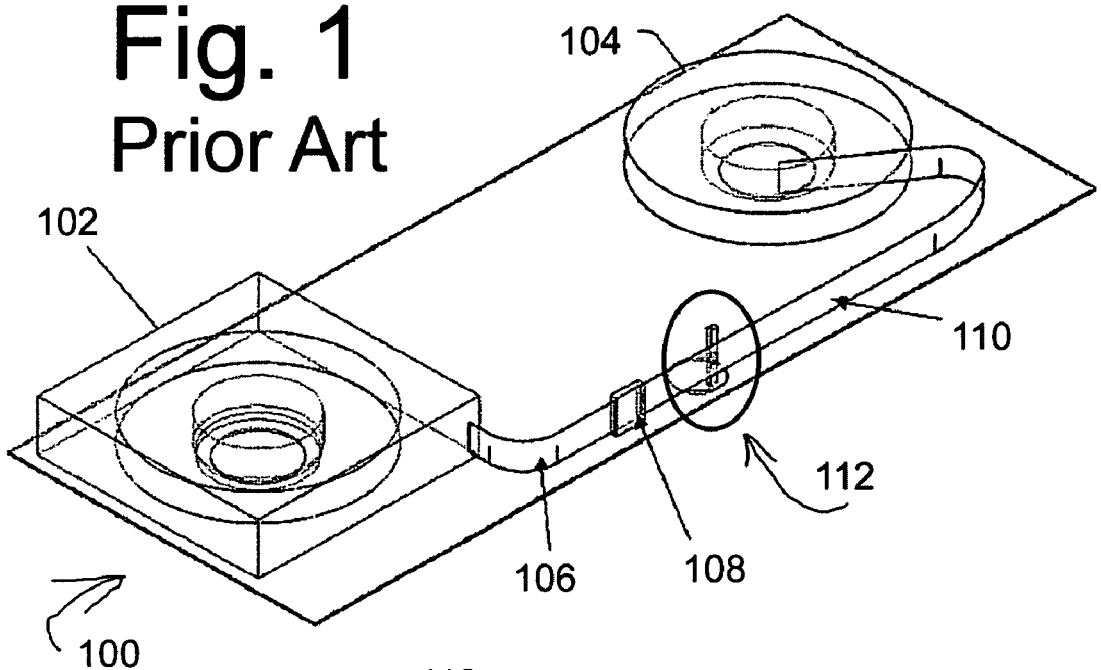
FIG. 1 schematically illustrates a conventional tape drive.
Figure 2:
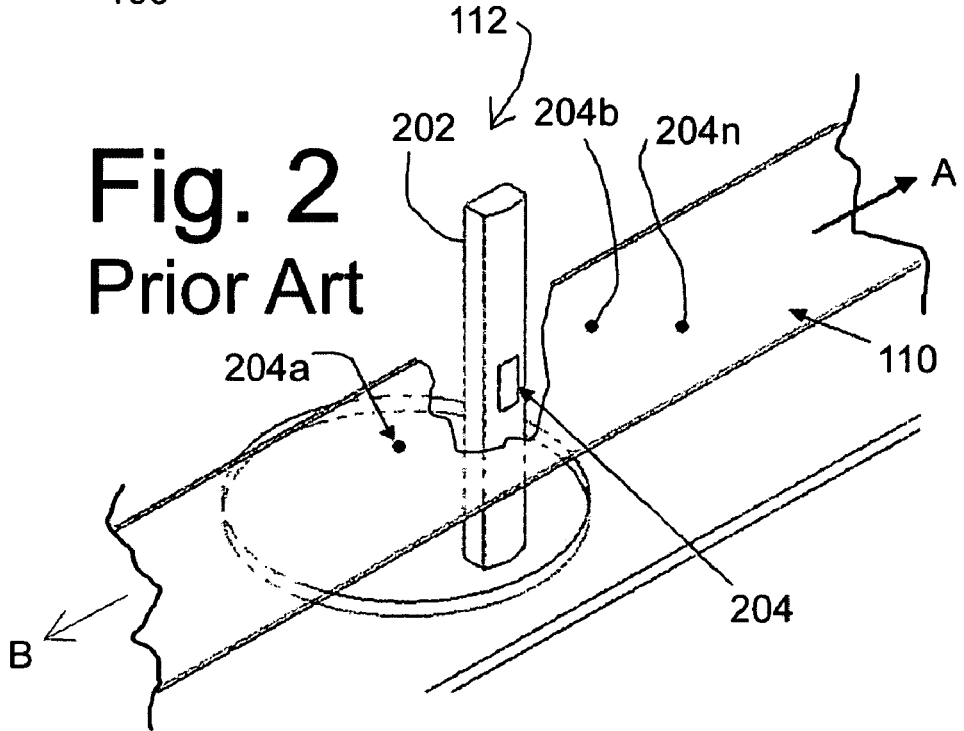
FIG. 2 schematically illustrates a conventional head guide assembly.
Figure 3:
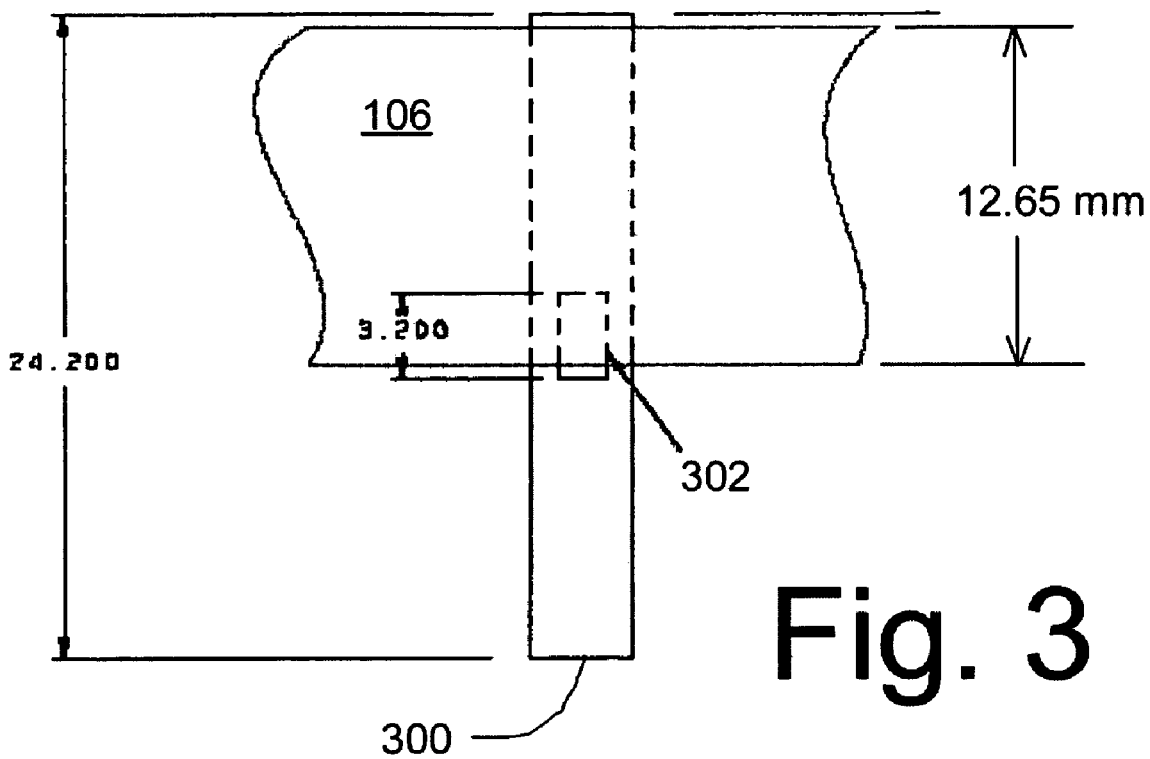
FIG. 3 schematically illustrates a portion of a current LTO-type linear tape drive.

As shown in FIG. 3, according to the presently preferred embodiment of the invention, a LTO-type linear tape drive has a head 300. The head may be various heights, however, the head 300 illustrated in FIG. 3 is about 24.2 mm tall. The head 300 contains head elements 302 for servo, and reading and writing data from or onto the tape. The head elements 302 illustrated in FIG. 3 are about 3.2 mm in height and are located substantially in the center of the head 300. The width of tape 106 is about 12.65 mm.

During operation the head 300 moves up and down so that the head elements 302 can read from or write to the tape 106 over substantially its complete width. As illustrated, the head 300 is located at its lowest position so that the bottom edge of the tape 106 is located slightly above the bottom edge of the head elements 302, and the upper edge of the tape 106 is slightly below the upper edge of the head 300 so that the full width of the tape is supported by the head 300. Similarly, when the head 300 is in its highest position, not shown, the top edge of the tape 106 is located slightly below the top edge of the head elements 302, and the lower edge of the tape 106 is slightly above the bottom edge of the head 300 so that the full width of the tape is supported by the head 300.

Figure 4:
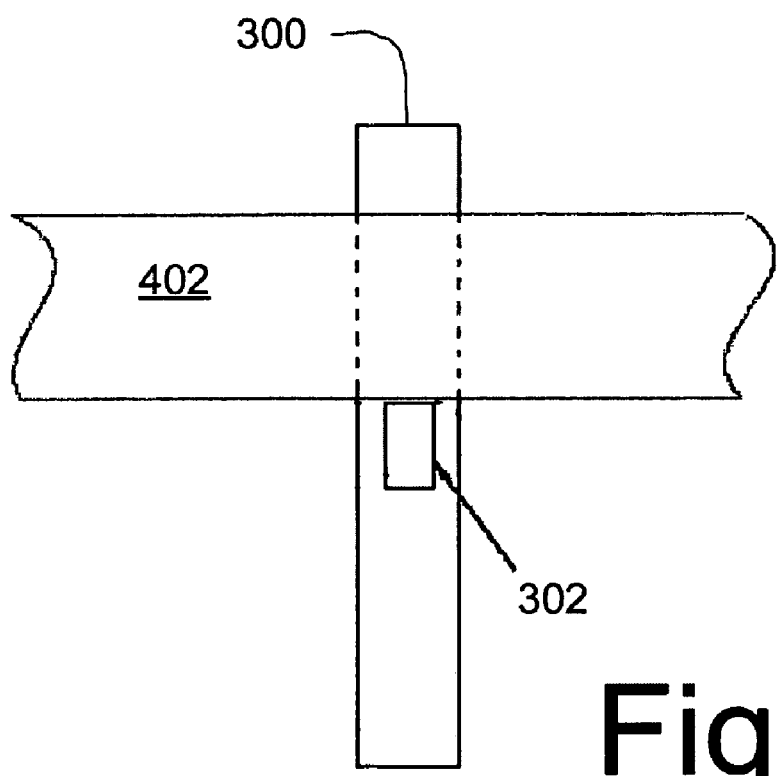
FIG. 4 illustrates the head guide assembly according to an embodiment of the present invention.

With reference to FIG. 4, the leader 402 has a width which is less than the width of the magnetic tape 106. In the present embodiment the leader 402 is preferably about 7.0 mm in width, and the tape is about 12.65 mm in width. Moreover, the width of the leader 402 is less than the distance between the upper edge of the head elements 302 and the top of the head 300, and the width of the leader 402 is less than the distance between the bottom of the head elements 302 and the bottom of the head 300. Thus when the head 300 is located in an up or down position, the leader 402 can pass above or below the head elements 406 without dragging particles across the surface of the head elements 302 while the leader is still completely supported by the head 300. In the present embodiment the distance between the upper edge of the head elements 302 and the top of the head 300 is the same as the distance between the bottom of the head elements 302 and the bottom of the head 300, which is about 10.500 mm.

Figure 5:
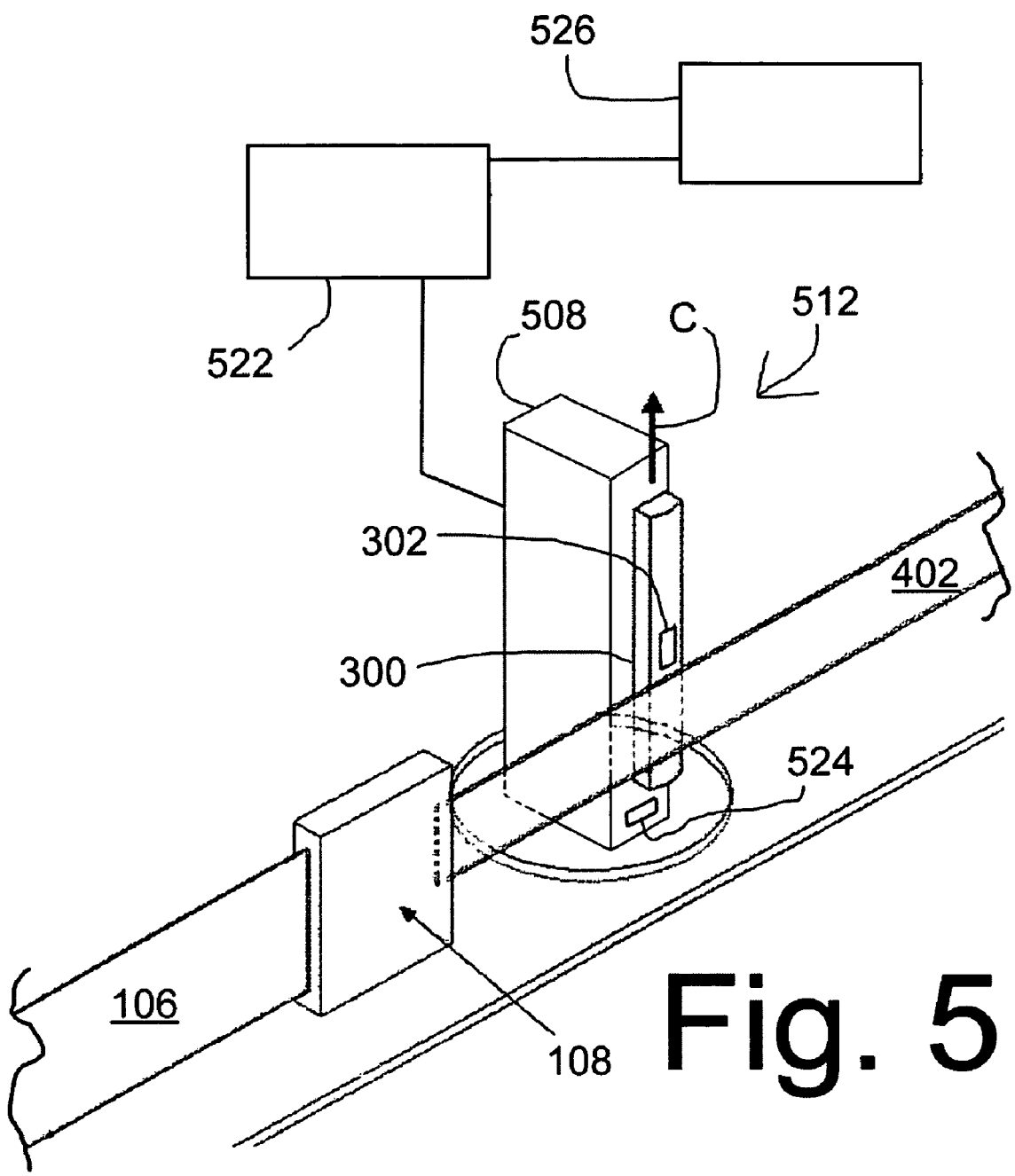
FIG. 5 illustrates the head guide assembly of FIG. 4 with an actuator.

FIG. 5 illustrates the head guide assembly in which the head 300 is mounted to an actuator 508. The head and head guide assembly, generally numbered 512, includes a head 300 with head elements 302. The leader 402 is narrower than the tape 106 such that it passes under the head elements 302 when the head 300 is moved to an up position, as illustrated by arrow C, by actuator 508. Although not illustrated, the actuator 508 may move the head 300 to a down position such that the leader 402 passes above the head elements 302.

A controller 522 is provided to instruct the actuator to position the head in the appropriate location. A conventional magneto resistive sensor 524 is connected to the actuator 508 to determine the height of the head 300 relative to a reference position, and a conventional reel motor encoder 526 is connected to the reel drive motors, not shown, to determine the extent to which the leader 402 and the tape 106 have been wound onto the take up reel 104.

A detailed explanation of an actuator 508 will not be provided herein in order to prevent obfuscation of the invention. However, for exemplary purposes only, it should be understood that the actuator 508 includes a voice coil motor (VCM) and a stepper motor, both of which are conventional. The stepper motor receives electrical signals from controller 522 to position the head 500 according to the received signals and position the head in the up position when necessary to prevent the leader 402 from contacting the head elements 302. On the other hand, when the tape 106 is in contact with the head elements 302 the stepper motor is used for coarse positioning, and the VCM is used for fine positioning of the head, in accordance with conventional practice.

Figure 6:
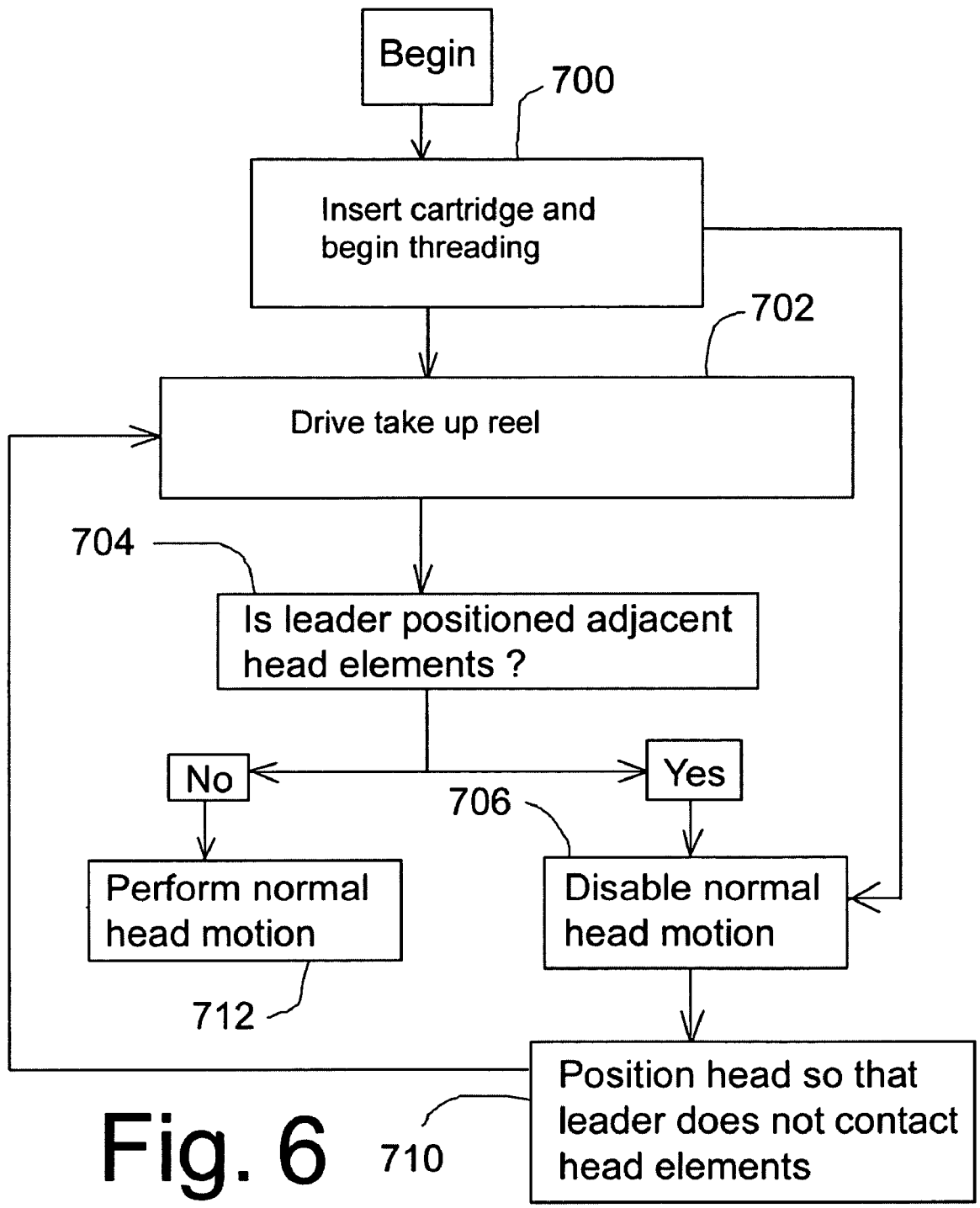
FIG. 6 illustrates a block diagram of a method for protecting head elements.

FIG. 6 is a block diagram illustrating the operation of the disclosed system. When the tape cartridge is initially inserted into the tape drive (step 700) the controller 522 instructs the actuator 508 to position the head 300 in the up position, and the controller 522 disables the normal up and down motion of the head, according to steps 706 and 710. Then the take up reel is driven (step 702), and the tape and the leader 402 are wound onto the take up reel 104. The reel motor encoder 526 monitors the rotation of the reel, and the length of the leader is known. Thus, based on information from the reel motor encoder 526, the controller determines when the leader is no longer positioned adjacent the head elements, according to step 704. When the controller 522 determines that the leader 402 has completely passed the head 300, the controller 522 controls the actuator 508 to lower the head 300 so that the head elements 302 contact the tape 106 and the controller enables normal tape up and down motion so that the tape is read normally, according to step 712.

Although not illustrated, it should be understood that when tape 106 is being unloaded from the take up reel 104 back onto the cartridge 102, the controller 522 instructs the actuator 508 to again position the head 300 in the up position so that the head elements 302 are located away from the leader 402. Thus it should be understood that the desired positioning of the head elements 302 may be accomplished with the proper sizing and location of the leader 402 in combination with a position control of the head 300 during threading and unthreading of the tape 106.

Figure 7:
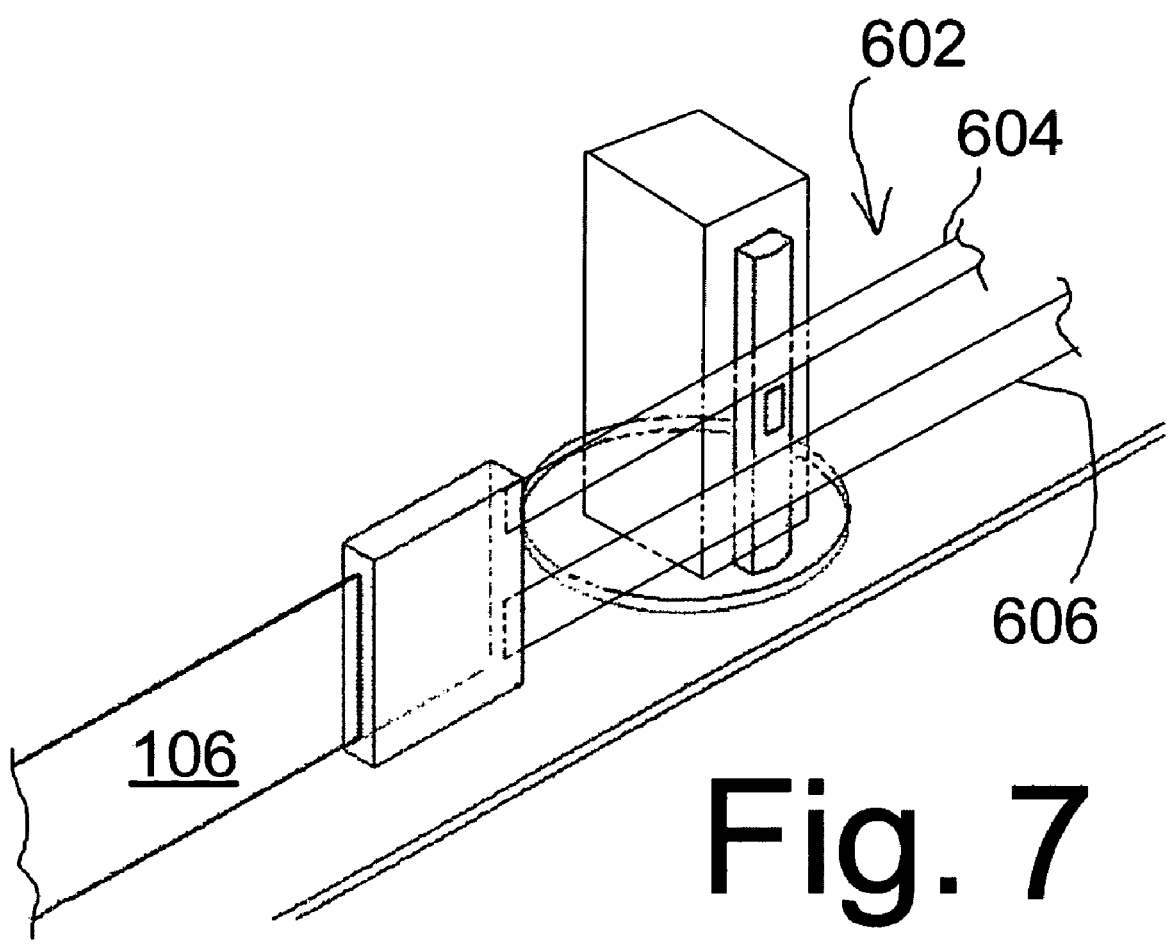
FIG. 7 illustrates the head guide assembly with another embodiment of the present invention.

FIG. 7 illustrates the head guide assembly with another embodiment of a leader. The leader 602 comprises a top section 604 and a bottom section 606, and the two sections are located so that the top section 604 passes above the top of the head elements 302 and the bottom section 606 passes below the bottom of the head elements 302. As such, the leader 602 does not contact the head elements 302, and the head 300 does not need to be moved up or down to avoid the leader 602. Furthermore, the width of the top section 604 and the width of the bottom section 606 are each less than the width of the tape 106.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus to protect head elements on a head of a tape drive, comprising:
    a tape head having one or more elements;
    a take up reel;
    a reel motor encoder operative to provide position signals indicating the position of a magnetic tape leader relative to the take up reel;
    an actuator operatively coupled to the tape drive head, wherein the actuator is constructed and arranged to displace the tape drive head orthogonally away from a tape path of a magnetic tape;
    a controller operative, in response to position signals transmitted by the reel motor encoder, to cause the actuator to displace the one or more elements of the tape drive head orthogonally away from the tape path.

2. The apparatus of claim 1 further comprising a magneto resistive sensor operatively coupled to the actuator, wherein the magneto resistive sensor peroxides signals indicating the height of the head relative to a reference position.

3. The apparatus of claim 1 wherein the actuator comprises a stepper motor for coarse positioning and a voice coil motor for fine positioning.

4. The apparatus of claim 1 wherein the width of the leader is less than the width of the magnetic tape.

5. The apparatus of claim 1 wherein the leader comprises a first section and a second section and said first and second sections are constructed so that said first section is located to a first side of the head elements and said second section is located to a second side of the head elements.

6. A method for protecting head elements of a tape drive, the method comprising:
   determining with a reel motor encoder whether a magnetic tape leader is adjacent to the head elements, wherein the reel motor encoder provides position signals indicating the position of the leader relative to a take up reel; and,
   displacing with an actuator the head orthogonally away from a tape path, wherein a controller causes the displacement in response to the position signals from the reel motor encoder.

7. A method according to claim 6 further comprising: determining whether the tape is adjacent the head elements; and, if the tape is adjacent the head elements, performing normal head motion.

8. The method of claim 6 wherein wherein the actuator comprises a steper motor for coarse positioning and a voice coil motor for fine positioning.

9. The method of claim 6 further comprising, determining whether the leader is adjacent the head elements; and, if the leader is adjacent to the head elements, moving the head in a direction orthogonally away from a tape path and disabling normal head motion.

10. The method of claim 6 wherein the leader comprises a first section and a second section and said first and second sections are constructed so that said first section is located to a first side of the head elements and said second section is located to a second side of the head elements.

11. The method of claim 6 wherein the leader has a width less than the width of the magnetic tape.

12. An apparatus to protect head elements of a tape drive, the apparatus comprising:
   means for providing position signals indicating position of a magnetic tape leader relative to a take up reel; and,
   means for displacing one or more elements of a tape drive head orthogonally away from a tape path response to the position signals.

13. The apparatus of claim 12 wherein the means for providing position signals comprises a reel motor encoder.

14. The apparatus of claim 12 wherein the means for displacing the tape drive head comprises an actuator with a stepper motor for coarse positioning and a voice coil motor for fine positioning.

15. The apparatus of claim 12 wherein the leader comprises a first section and a second section and said first and second sections are constructed so that said first section is located to a first side of the head elements and said second section is located to a second side of the head elements.

16. The apparatus of claim 12 wherein the leader has a width less than the width of the magnetic tape.

\* \* \* \* \*

UNITED STATES PATENT AND TRADEMARK OFFICE
CERTIFICATE OF CORRECTION

PATENT NO. : 7,274,528 B2 Page 1 of 1
APPLICATION NO. : 11/083651
DATED : September 25, 2007
INVENTOR(S) : Hamming et al.

It is certified that error appears in the above-identified patent and that said Letters Patent is hereby corrected as shown below:

Column 4, line 66, change "peroxides" to --provides--

Signed and Sealed this

Fourth Day of December, 2007

JON W. DUDAS
*Director of the United States Patent and Trademark Office*